United States Patent

Bürger et al.

[11] 4,148,752
[45] Apr. 10, 1979

[54] PRODUCTION OF ACTIVATED CARBON IN A REACTOR HAVING A LOWER STATIC LAYER AND AN UPPER FLUIDIZED LAYER

[75] Inventors: Alex Bürger, Cologne; Hans Guth, Leverkusen; Werner Ludovici, Leverkusen; Hermann Rohe, Leverkusen, all of Fed. Rep. of Germany

[73] Assignee: Bayer Aktiengesellschaft, Leverkusen, Fed. Rep. of Germany

[21] Appl. No.: 924,787

[22] Filed: Jul. 14, 1978

Related U.S. Application Data

[63] Continuation-in-part of Ser. No. 783,369, Mar. 31, 1977, abandoned.

[30] Foreign Application Priority Data

Sep. 4, 1976 [DE] Fed. Rep. of Germany ....... 2615437

[51] Int. Cl.² .......................... C01B 31/10; B01J 21/18
[52] U.S. Cl. .................................. 252/421; 201/31; 432/15
[58] Field of Search ................. 252/421, 445; 423/449; 201/31

[56] References Cited

U.S. PATENT DOCUMENTS

| | | | |
|---|---|---|---|
| 2,933,454 | 4/1960 | Repik et al. | 252/420 |
| 3,565,827 | 2/1971 | Friday | 252/421 |
| 3,910,849 | 10/1975 | Kawabata et al. | 252/421 |
| 4,039,290 | 8/1977 | Inada et al. | 252/417 |

FOREIGN PATENT DOCUMENTS 2410372 9/1975 Fed. Rep. of Germany ........... 252/420

Primary Examiner—Winston A. Douglas
Assistant Examiner—P. E. Konopka
Attorney, Agent, or Firm—Sprung, Felfe, Horn, Lynch & Kramer

[57] ABSTRACT

In the production of activated carbon by passing a preheated gaseous activation medium through a zone containing a bed of carbon-containing material while indirectly heating to maintain a temperature of about 500° to 1100° C., supplying carbon-containing material to the bed, and removing activated carbon from the bed, the improvement which comprises introducing the activation medium and the carbon-containing material co-current near the bottom of the zone at a rate such that gaseous products are formed in a quantity sufficient to maintain in the zone a lower static layer and an upper fluidized layer in particular proportions, the rate of supply of the carbon-containing material and withdrawal of activated carbon being related so as to convert about 30 to 55% by weight of the carbon-containing material to gaseous products. The average residence of the carbon-containing material is from about 0.2 to 6, preferably 1 to 4, hours. A suitable apparatus for carrying out the process is described.

2 Claims, 1 Drawing Figure

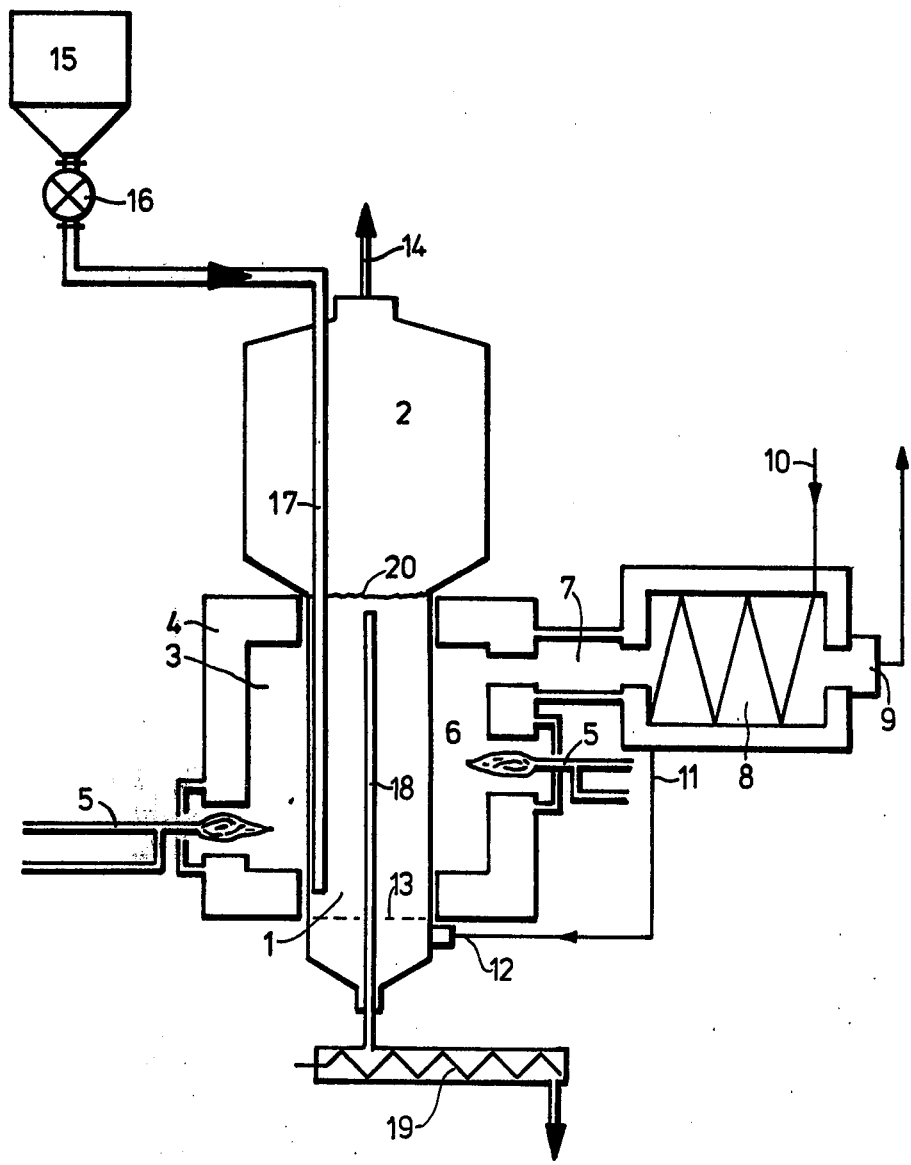

PRODUCTION OF ACTIVATED CARBON IN A REACTOR HAVING A LOWER STATIC LAYER AND AN UPPER FLUIDIZED LAYER

This is a continuation-in-part of application Ser. No. 783,369, filed Mar. 31, 1977, now abandoned.

The invention relates to a process for the production of activated carbon from a material containing carbon by reaction with a preheated gaseous medium in an indirectly heated, single stage fluidized reactor.

Processes are already known for the production of activated carbon in a fluidized bed. The supply of the necessary process heat in such arrangements can be effected by either direct or indirect heating.

In the case of direct heating, air or oxygen, optionally in a mixture with a gaseous, liquid or solid fuel (cf. German Pat. No. 469,277, British Pat. No. 1,183,311, British Pat. No. 1,147,533) is blown into the combustion chamber. This process has the disadvantage that the oxygen introduced reacts with the starting material containing carbon in the fluidized bed and with the already activated material, reducing the yield. Also when fuel is supplied, the oxygen reacts at least partially with already activated material.

A further direct heating method consists of the introduction of hot gases (cf. German Pat. No. 463,772) into the fluidized layer. With this method there arises a high degree of abrasion and dust, which is easily removed; in addition there is an unfavorable ratio of solid to gas. This on one hand arises from the fact that combustion gases, in particular with the use of air, cannot be produced economically with a sufficiently high temperature and on the other hand possess only a relatively low specific heat. Therefore large quantities of gas must be supplied to the fluidized reactor to carry out the highly endothermic activation process, if good space-time yields are to be achieved. The result of this is a high gas speed in the fluidized bed which, in particular in the case of fine grained and light material, leads to a high solid discharge. The residence time in the reactor is then insufficient for the production of a high value activated carbon and there is very much breakage and abrasion of the solid. With the supply of smaller quantities of gas which are quite sufficient for the production of a fluidized condition, however, too little heat is supplied to the reactor, i.e. the space time yield becomes substantially worse.

In addition, processes are known in which the heating of the reactor chamber is effected indirectly.

Thus for example according to British Pat. No. 965,709 a fluidized reactor is operated with electrical heating, which can be heated both directly and also indirectly and in which mineral coal is activated in countercurrent. The process is operated batchwise but can also be conducted continuously. It has a number of disadvantages. Thus for example anthracite is used as a raw material in the case of high consumption of carbon. The very fine fractions are discharged virtually immediately without having been sufficiently activated.

The result therefore is a qualitatively poor activated carbon. Moreover, because of the good mixing of the reaction material striven for, a material is discharged having a greatly varying degree of activation.

German Offenlegungsschrift No. 2,047,324 describes a process with indirect heating, in which activated carbon is produced in a plurality of consecutively arranged reaction zones in each case with overflows into the following zone. This process avoids the disadvantages of the above described process but with a considerably greater technical complexity.

The object of the invention therefore is to produce in a simple and economic manner substantially avoiding the known disadvantages of both the single stage and the multistage processes from various starting materials containing carbon an activated carbon of good quality for varying applications.

The present invention therefore relates to a process for the production of activated carbon by activating a material containing carbon with a preheated gaseous activation medium with indirect heat supply at temperatures of about 500° to 1100° C., characterized in that in the reactor a lower static and an upper fluidized layer are established and the material is introduced in co-current with the activation medium in the lower half of the reaction zone and the activated carbon is discharged in the upper part of the reaction zone, the residence time of the material containing carbon being adjusted so that a maximum of about 30 to 55% reacts forming gaseous products.

The invention also relates to an apparatus for carrying out the process, comprising an activation furnace having a cylindrical reaction chamber an extended calming chamber and an annular burner chamber with an insulating brick work and a plurality of staggered burners arranged at different heights and of a filling pipe for the material to be activated and an overflow for the activated material and a heat exchanger for preheating the activating gases with the combustion gases from the burner chamber.

To adjust the material to be activated to form a lower, quasi-static and a separate upper fluidized layer, the speed of the activating gas in the reactor should be adjusted so that it is not above the loosening speed of the charge material, the loosening speed being taken to mean the gas speed at which the resistance of the particles against the gas flow no longer increases. The loosening speed must be adapted to the particular material to be activated and should be calculated according to the theoretical bases for fluidized bed technology or be determined by a preliminary test in model tests ("Grundlagen der Einphasen- und Mehrphasenstromung," H. Brauer, Verlag Sauerländer, 1971, Aarau, Frankfurt am Main, pages 460 to 465).

The process is furthermore carried out so that complete mixture of the material and a disordered discharge does not take place but that two layers form with only the lighter and at least already partially activated particles being located in the upper fluidized layer. The material to be activated is thus introduced in the lower peripheral part of the cylindrical reaction zone and the activated material is discharged in the upper central part.

The ratio of the static to the moving layer remains constant with the observance of the conditions according to the invention despite certain fluctuations in the particle size of the input and output material, and it is noteworthy that the static layer as such is not degraded, although the particles in this layer react. The particles having become lighter and smaller as a result of the activation pass into the fluidized layer and are replaced in the lower static layer by heavy coarse input material.

The lower static layer comprises about 5 to 45% by weight of the lower plus upper layers, the upper layer thus comprising about 55 to 95% by weight. The material fed undergoes a high weight loss as well so that its overall density decreases and it moves into the upper layer. The density of the lower layer is from about 1.3 to 1.8 times that in the upper layer in fluidized condition. If the fluidizing is discontinued, in static condition the density in the lower layer is about 1.5 to 2.5 times that of the upper layer.

Using the process described, a good, commercial, substantially uniform activate is obtained with high space time yields.

A further advantage of the process is the lowering of the breakage and abrasion to a minimum, because the material is substantially preserved by the relatively low gas speed required in the activation of formed or granular material.

The process is described hereinbelow with reference to the drawing which is a schematic sectional view of a preferred embodiment of apparatus for carrying out the process according to the invention.

The numerals in this illustration have the following individual meanings:

1: Reaction chamber
2: Calming chamber
3: Burner chamber
4: Insulation
5: Burner
6: Casing
7: Outlet
8: Inlet for the combustion gas into the heat exchanger
9: Outlet
10: Inlet for the activation gas to the heat exchanger
11: Outlet for the activation gas from the heat exchanger
12: Inlet for the activation gas into the reactor
13: Exhaust floor
14: Outlet
15: Bunker
16: Dosing device
17: Feed pipe
18: Discharge pipe
19: Discharge device
20: Height of fluidized bed The fluidized reactor consists of the cylindrical reaction chamber 1, the extended calming chamber 2 and the annular burner chamber 3. The burner chamber is insulated from the environment by surrounding brickwork 4. The burner chamber is heated by means of a plurality of staggered burners 5 arranged at varying heights, which are supplied with oxygen or air and a fuel gas. In the burner chamber there is produced a hot gas flow circulating from bottom to top which gives off a part of its heat to the casing 6 of the reaction chamber.

The combustion gas leaves the burner chamber at a temperature of approximately 1000° to 1250° C. at 7 and enters the heat exchanger 8 where it serves to preheat the activation gas and leaves the heat exchanger at 9. After leaving the heat exchanger the combustion gas still at about 800° to 900° C. is used for steam production. The activation gas enters the heat exchanger at 10. It is heated to a temperature of about 500° to 900° C., leaves the heat exchanger at 11 and is guided at 12 into the reactor. The introduction of the activation gas is effected underneath the floor 13. After passing through the floor, the reaction of the gas with the starting material containing carbon takes place in the fluidized bed in the chamber 1.

From the fluidized bed there issues a mixture of activation gas and gaseous reaction products. This flows through the calming chamber 2 and leaves the reactor at 14 at a temperature of about 500° to 1000° C. The gas mixture is cooled and freed of dust. This is optionally associated with a simultaneous vapor production. With the use of water vapor as an activation means, on cooling to room temperature a simultaneous condensation of the water vapor takes place. There remains a gas mixture containing principally hydrogen and carbon monoxide. A part of this gas is used instead of natural gas for the production of the necessary process heat in the burners 5. In this way the process becomes independent of outside energy, the remaining excess is burned and the heat thus produced is used for energy production, e.g. steam production.

In the event of larger quantities being produced, the gas can also be used as a synthesis gas for the production of, for example, formaldehyde, methanol and methane.

The charge material is stored in the bunker 15 and passes from there via the dosing device 16 and the feed pipe 17 to the lower peripheral part of the fluidized bed. The activated material is drawn off via the discharge pipe 18 from the upper central part of the fluidized bed and delivered via a screw 19. The discharge of the activated material via the screw takes place so that the height 20 of the fluidized bed determined by means of differential pressure measurements is kept constant.

The apparatus described is very advantageous because as a result of the separation of the heating and fluidizing means in contrast to the directly heated fluidized reactor, independent regulation of heating and gas speed in the fluidized bed is made possible. Therefore materials having the most varied granulation and powder density can be used since any gas speed required for their fluidization can be adjusted without other aspects of the process being affected as a result. Particularly with granular and molded carbons, activation takes place with the greatest possible preservation of the material and production of an activated material with a uniform degree of activation.

Because of the simple single stage method of execution and the large reactor cross-sectional area, materials can also be used which are inclined to become baked and encrusted without the continuation of the process immediately becoming substantially disrupted. The choice of possible charge materials is thus greatly increased. The need for repairs is also smaller in the present case than with a multistage installation. Further advantages of the process are the independence from outside sources of energy and the possibility of exploiting the hot waste gases for steam generation.

Suitable starting materials containing carbon include all substances which can be used for the production of activated carbon by gas activation, e.g. peat coke, brown coal coke, carbonized lignite, carbonized vegetable products based on wood, coconut shells and fruit pits, and in addition coal, petroleum coke, acid sludge coke and mixtures thereof. In many cases the substances are pulverized by breaking before use. With the process according to the invention it is not necessary to observe a narrow particle size spectrum. The starting material can also be processed in a finely ground state with a binding agent, e.g. tar or pitch, to form molded bodies. These moldings may optionally be subjected before use to a low temperature carbonization process.

The particle size of the starting material is therefore greatly variable. In the case of broken starting materials, particle sizes preferably over about 0.1 mm are suitable, and the upper particle size is approximately 8 mm. Materials having larger particle sizes can also be used but this is not advisable for economic reasons. The preferred particle size of the starting material is between about 0.5 and 5 mm. In the case of molded products, moldings having dimensions of approximately 1 to 6 mm diameter and 1 to 15 mm length are preferably used. Here also, even larger moldings can be used but this is not advisable for economic reasons.

For fluidization and activation, oxygen, air, carbon dioxide, water vapor and mixtures of these gases are used, but preferably water vapor is used.

Depending on the activation medium used, the reaction temperatures are between about 500° and 1100° C. If water vapor is used as the activation medium temperatures between about 600° and 1000° C. are used.

The residence time in the fluidized bed is dependent on the fineness and reactivity of the starting material used and on the type of activation medium used. With the use of very fine and reactive starting materials and with the activation with water vapor, air or oxygen mixtures, residence times of about 0.2 hours are suitable. In the case of the use of large, less reactive moldings the residence time is up to about 6 hours. In the case of the use of materials having the preferred particle size of about 0.5 to 5 mm and the use of water vapor as the activation medium, the residence time is approximately 1 to 3 hours.

The flow speed of the fluidizing medium relative to the cross-section of the reactor, is dependent on the average particle size, the particle size distribution, the form of the particles and the bulk material density of the material to be activated. It is between approximately 0.1 and 2.0 meters per second.

With the process according to the invention an activated carbon of good commercial quality is obtained.

The process according to the invention is described in more detail with reference to the following examples employing the apparatus shown in the drawing.

EXAMPLE 1

2.9 t of broken peat coke per day having a particle size of 0.315 to 3.15 mm were continuously fed into a reactor and fluidized at a gas speed of 21 cm per second. The activation temperature was 820° C. The mean residence time was 0.9 hours. The output was 2.0 t per day. The internal surface of the activated carbon produced, according to the method of Brunauer, Emmet and Teller, was 910 $m^2/g$. The benzene adsorption at 90% saturation in air at 20° C. was 34 g/100 g activate. The methylene blue capacity corresponded to an adsorption of 2250 mg methylene blue per 100 g activate from a 0.15% solution at room temperature. A molasses solution having a color intensity of 13.5° Stammer was decolorized by 50% with the use of 4.4 g activate.

In expanded state the density of the upper layer was 180 g/100 ml and that of the lower layer 340 g/100 ml. If samples were withdrawn and measured at rest, the upper layer density was 215 g/100 ml and the lower 360 g/100 ml.

EXAMPLE 2

3.0 t broken brown coal low temperature carbonization coke having a particle size of from 0.5 to 3.15 mm were continuously supplied and fluidized at a gas speed of 25 cm per second. The activation temperature was 830° C.; the residence time was 1.6 hours. The output was 1.9 t per day. Internal surface: 980 $m^2/g$; benzene adsorption 40 g; methylene blue capacity 1800 mg; charge for 50% decolorized of a molasses solution 3.8 g/l.

In expanded state the density of the upper layer was 220 g/100 ml and that of the lower layer 515 g/100 ml. If samples were withdrawn and measured at rest, the upper layer density was 320 g/100 ml and the lower 540 g/100 ml.

EXAMPLE 3

1.5 t per day of a molded material based on coal (dimensions of the cylindrical moldings 6.0×4.0–12.0 mm) were continuously supplied at a gas speed of 138 cm per second. In the lower part of the reactor there was a static layer and in the upper part a completely fluidized layer. The activation temperature was 880° C. The residence time was 4 hours. (Output: 0.66 t per day—of which 90% had a grain size over 3.15 mm. Internal surface 1070 $m^2/g$; benzene adsorption 45 g; methylene blue capacity 2550 mg.)

In expanded state the density of the upper layer was 360 g/100 ml and that of the lower layer 620 g/100 ml. If samples were withdrawn and measured at rest, the upper layer density was 480 g/100 ml and the lower 640 g/100 ml.

It will be appreciated that the instant specification and examples are set forth by way of illustration and not limitation, and that various modifications and changes may be made without departing from the spirit and scope of the present invention.

What is claimed is:

1. In the production of activated carbon by passing a preheated gaseous activation medium through a zone containing a bed of carbon-containing material while indirectly heating to maintain a temperature of about 500° to 1100° C., supplying carbon-containing material to the bed, and removing activated carbon from the bed, the improvement which comprises making the reaction zone cylindrical, introducing the activation medium and the carbon-containing material co-current near the bottom of the zone at a rate such that activation medium and gaseous products which are formed are in a quantity sufficient to maintain in the zone a lower static layer and an upper fluidized layer, the lower static layer comprising about 5 to 45% by weight of the lower plus upper layers, the density of the lower layer ranging from about 1.3 to 1.8 times that of the upper fluidized layer, introducing the carbon-containing material in the lower peripheral part of the zone and removing the activated carbon from the upper central part of the zone, the average residence time of the carbon-containing material in the zone being from about 0.2 to 6 hours, thereby converting about 30 to 55% by weight of the carbon-containing material to gaseous products.

2. A process according to claim 1, wherein the residence time of the carbon-containing material in the zone is from about 1 to about 4 hours.

* * * * *

UNITED STATES PATENT AND TRADEMARK OFFICE
CERTIFICATE OF CORRECTION

PATENT NO. : 4,148,752
DATED : Apr. 10, 1979
INVENTOR(S) : Alex Bürger et al

It is certified that error appears in the above-identified patent and that said Letters Patent are hereby corrected as shown below:

Title Page Delete "Sep. 4, 1976" and insert
Priority --Apr. 9, 1976--.

Signed and Sealed this

Nineteenth Day of May 1981

[SEAL]

Attest:

RENE D. TEGTMEYER

Attesting Officer     Acting Commissioner of Patents and Trademarks